United States Patent [11] 3,614,304

[72] Inventor Helmut Schonfelder
Darmstadt, Germany
[21] Appl. No. 12,892
[22] Filed Feb. 17, 1970
[23] Continuation of Ser. No. 604,972, Dec. 27, 1966.
[45] Patented Oct. 19, 1971
[73] Assignee Fernseh GmbH
Darmstadt, Germany
[32] Priority Dec. 30, 1965
[33] Germany
[31] F 48052

[54] VECTOR OSCILLOSCOPE
13 Claims, 4 Drawing Figs.

[52] U.S. Cl. .......... 178/5.4 TE
[51] Int. Cl. .......... H04n 9/02
[50] Field of Search .......... 324/77, 86, 88, 91; 178/5.4 TE, 5.4 P

[56] References Cited
UNITED STATES PATENTS

| | | | |
|---|---|---|---|
| 2,751,429 | 6/1956 | Schlesinger .......... | 178/5.4 |
| 3,230,304 | 1/1966 | Schonfelder .......... | 178/5.4 |

*Primary Examiner*—Robert L. Griffin
*Assistant Examiner*—John C. Martin
*Attorney*—Michael S. Striker

ABSTRACT: A vector oscilloscope through which a PAL color television signal is displayed. The signal has two components of which one is of known phase. The other of the components is of alternating negative and positive phase. The components last for one line of scan, and are applied to the deflection plates of an oscilloscope tube. The two components are suppressed during alternating line scans. Suppression is accomplished through two synchronous demodulators connected in parallel. The outputs of the demodulators are applied to the deflection plates of the oscilloscope tube, by way of amplifiers.

*Inventor:*
*Helmut Schönfelder*

*by* [signature]
*Attorney*

Inventor:
Helmut Schönfelder
by
Attorney

INVENTOR
HELMUT SCHÖNFELDER
BY [signature]
ATTORNEY

VECTOR OSCILLOSCOPE

The present invention relates to a vector oscilloscope, particularly for displaying a PAL color television signal, whereby a first color difference component of the modulated color carrier is transmitted with a predetermined phase relationship, and a second color difference component of the modulated color carrier is transmitted alternately with positive and negative phase relationships for the duration of even and odd lines. The two demodulated color difference components are supplied to the deflection electrodes of an oscilloscope tube.

In a PAL color television signal the (R–Y) component is switched through 180° from line to line. In reproducing such a signal on the screen of a conventional vector oscilloscope both phase relationships are exhibited. Measurements made by the color bar test then give twice the number of spots, since the complex color spot conjugated with the (B–Y) axis is exhibited for each color. This double representation makes reading very difficult. To enable the color spots to be brought within the zones of tolerance shown on the scale of the oscilloscope the color spots belonging to a given phase relationship must first be laboriously ascertained.

It is, therefore, a main object of the invention to provide a vector oscilloscope which avoids the above disadvantages.

According to the invention the two demodulated color difference components are suppressed either for the duration of even lines or for the duration of odd lines. The vector oscilloscope according to the invention has the advantage that the spots belonging to a phase relationship can be plotted or evaluated very simply.

The modulated color carrier is generally supplied to two synchronous demodulators, the outputs of which are connected, each by an amplifier, to the deflection electrodes of the oscilloscope tube. In a preferred embodiment of the invention the modulated color carrier is supplied to the two synchronous demodulators through a gate, and the gate is controlled such a way that a modulated color carrier is let through it only for the duration of those (even or odd) lines during which the phase relationship of the second color difference component associated with a scale is transmitted. This brings the advantage that the scale does not have to be exchanged, since the correct phase relationship of the second color difference component is very exhibited. However, the other phase relationship may also be exhibited without the scale having to be changed. This is made possible, in that the modulated color carrier is let through the gate only for the duration of those lines during which the phase relationship of the second color difference component not associated with the scale is transmitted, and the phase relationship of the transmitted second color difference component is displaced through 180°.

The above and still further features, objects and advantages of the present invention will become more apparent upon consideration of the following detailed disclosure of a specific embodiment thereof, especially when taken in conjunction with the accompanying drawings, wherein:

FIG. 1 shows a scale on which are set out the zones of tolerance, phase angles and lines making up a PAL color television signal. The complex color spot conjugated with the (B–Y) axis is shown for each color, making reading very difficult.

FIG. 2 shows the same scale as FIG. 1 but only with those spots of the signal belonging to one phase relationship; it is now far clearer and easier to evaluate.

Figure 3:
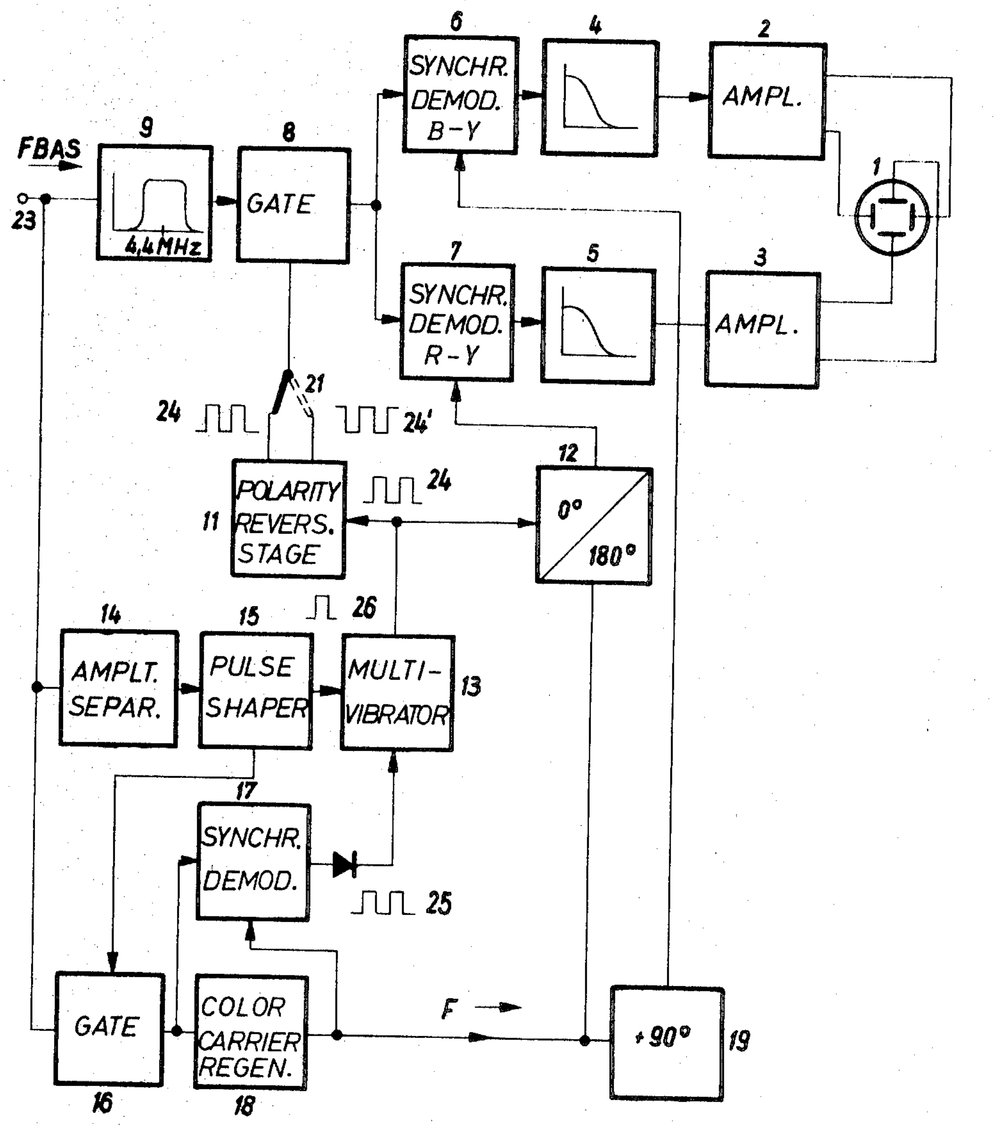
FIG. 3 is a block-type circuit diagram for a vector oscilloscope according to the invention.

FIG. 3 shows an oscilloscope tube 1, amplifiers 2, 3, low-pass filters 4, 5, synchronous demodulators 6, 7, gate 8, band-pass filter 9, polarity reversal stage 11, phase switch 12, multivibrator 13, amplitude separator 14, pulse shaper 15, gate 16, synchronous demodulator 17, color carrier regenerator 18, 90° phase shifter 19, and switch 21.

Figure 1:
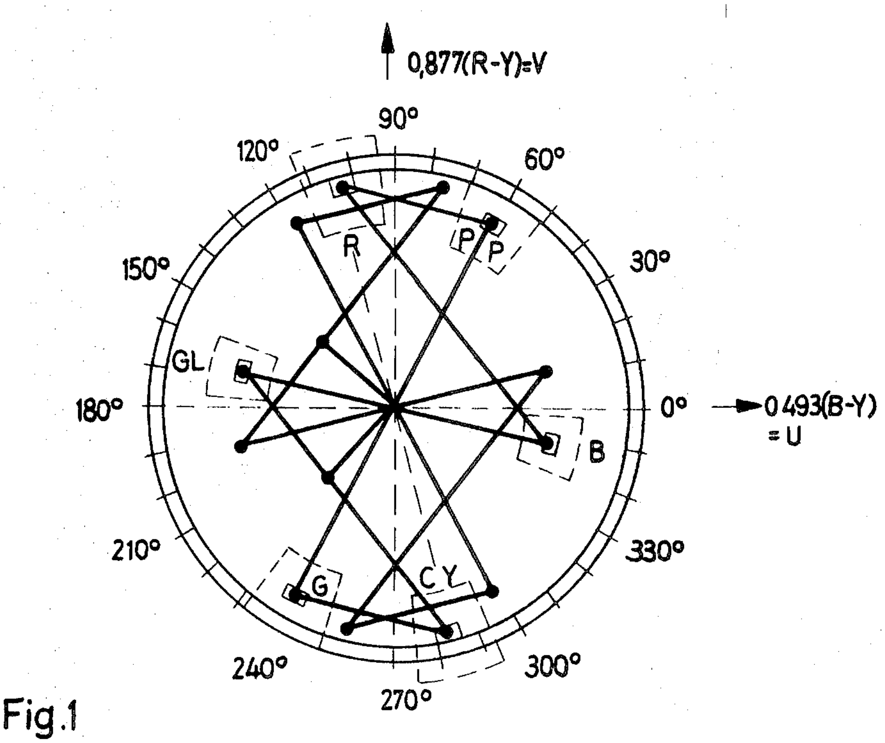
FIG. 1 shows a vector oscillogram as obtained with a known oscilloscope.

The vector oscilloscope shown in FIG. 3 serves to display a PAL color television signal FBAS supplied through terminal 23. With such a signal a first color difference component (B–Y) of the modulated color carrier is in known manner transmitted in a predetermined phase relationship, while a second color difference component (R–Y) of this carrier is transmitted alternately in a positive and negative phase relationship for the duration of even and odd lines. If substantially only components and stages 1 to 7, 9, 16, 18 and 19 are used (as in known vector oscilloscopes) then a color television signal as shown in FIG. 1 will be traced on the screen of the oscilloscope tube 1. This known type of representation lacks clarity.

Figure 4:
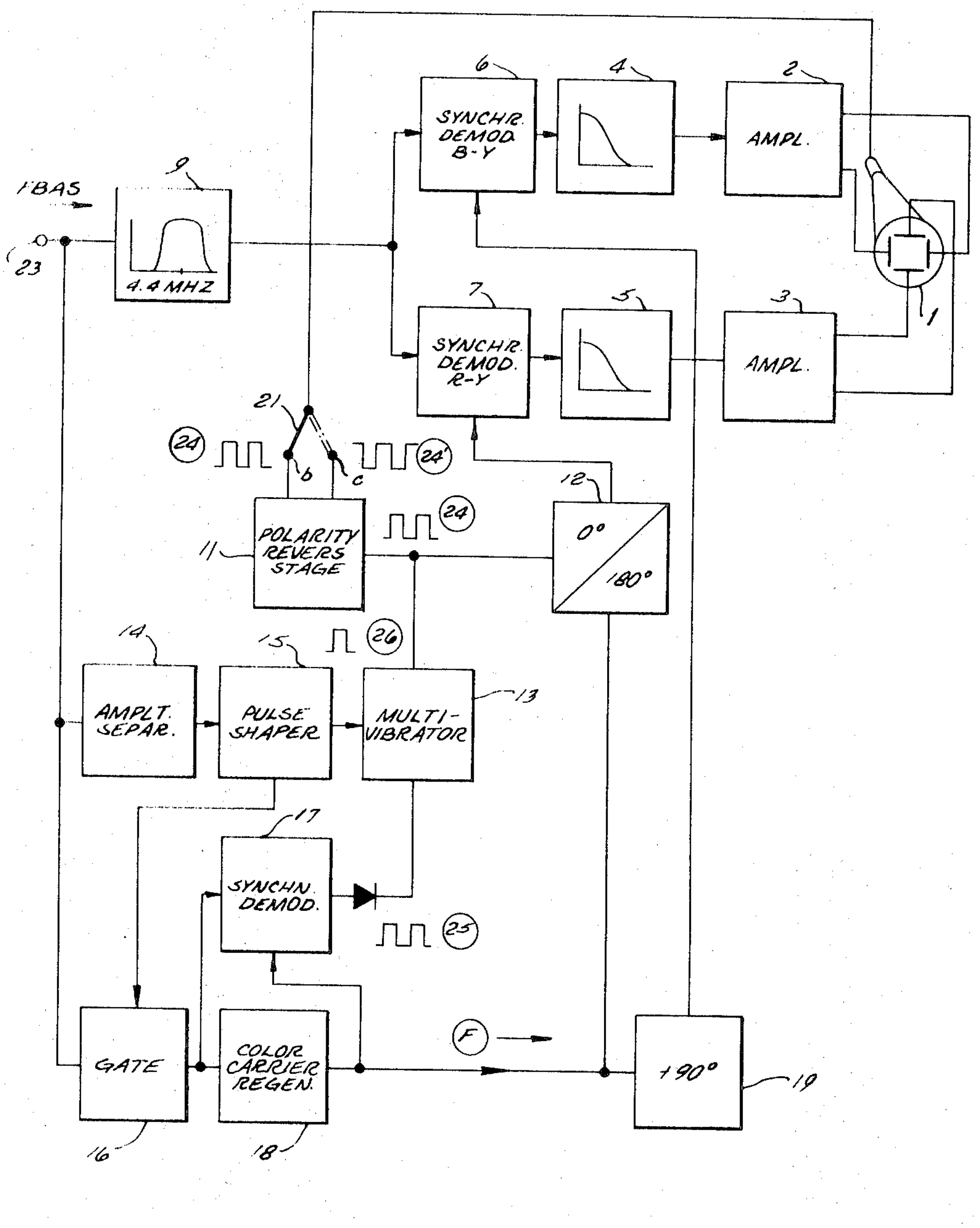
FIG. 4 is a block diagram of a second embodiment of the invention.

In order to represent a PAL color television signal in a clearer way, both demodulated color difference components (R–Y) and (B–Y) are suppressed for the duration of even or odd lines. This can be achieved by means of a control voltage supplied to a control electrode, such as the cathode or grid, of the oscilloscope tube 1. This control voltage is the same as the pulses supplied to the gate 8 by the polarity-reversing stage 11 in the embodiment shown in FIG. 3. The gate 8 is omitted, and this embodiment is shown in FIG. 4. In the other embodiment of the invention, however, shown in FIG. 3, the modulated color carrier let through the band-pass filter 9 is supplied through the gate 8 to the two synchronous demodulators 6 and 7. The gage 8 is controlled in such a way that the modulated color carrier is suppressed for the duration of even or odd lines. The gate is thus controlled by means of a rectangular pulse sequence 24 supplied via the switch 21.

Figure 2:
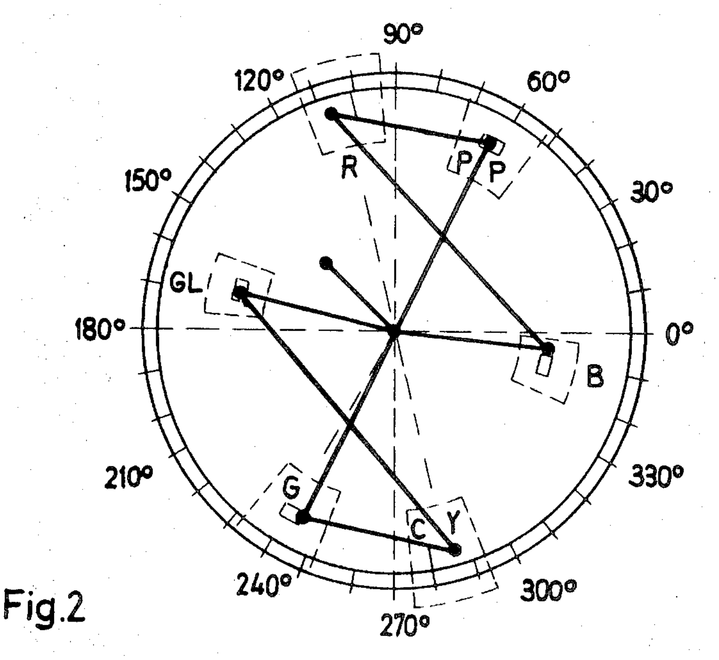
FIG. 2 shows a vector oscillogram as obtained with the oscilloscope according to the invention.

A scale associated with the positive phase relationship of the second color difference component (R–Y) of the modulated color carrier is mounted in front of the screen of the oscilloscope tube 1 (FIGS. 1 and 2). If therefore only even lines are transmitted, only the positive phase relationship of the second component (R–Y) will be exhibited. In this case the scale provided can be used. If only odd lines are transmitted, only the negative phase relationship of the second component (R–Y) will be exhibited, in which case the scale provided is not applicable. It would in fact be possible to have one scale for measuring the positive phase, and one for measuring the negative phase relationship and to exchange these when necessary, although this would be very time consuming.

In the present example of the invention only the positive phase relationship is automatically exhibited during a first operative condition so that the scale provided can always be used. A pulse sequence 25 is therefore derived from the PAL color television signal FBAS using the gate 16, synchronous demodulator 17 and color carrier regenerator 18, the frequency of the pulse sequence being equal to half the line frequency and its phase relationship coinciding with the positive phase relationship of the second component (R–Y). A line-frequency pulse sequence 26 is additionally derived using the amplitude separator 14 and pulse shaper 15. By means of the pulse sequence 25 and 26 the pulse generator 13 (a multivibrator) is synchronized so that the phase relationship of the sequence 24 also coincides with the positive phase relationship of the second component (R–Y). The sequence 24 is led to the gate 8 by way of the polarity-reversing stage 11 and the switch 21 (heavy-line position).

In practice it is desirable for the two phase relationships of the second component (R–Y) to be displayed in succession. The translation of one of these relationships during the first operating condition has already been described. During a second operative condition (switch 21 in dotted-line position) the other (negative) phase relationship is automatically exhibited. The polarity of the pulse sequence 24 is reversed at stage 11 and the pulse sequence 24′ is supplied to the gate 8. As the result of this step the modulated color carrier is let through only during odd lines. To enable the existing scale (shown in FIGS. 1 and 2) to be used here too, the now-negative phase relationship of the second component (R–Y) is displaced through 180°. This is done by means of the electrically controlled phase switch 12, to which the pulse sequence 24 is supplied during the second operative condition (dotted line position of switch) and which alternately shifts the phase through 0° and 180° line by line.

What is claimed as new and desired to be secured by Letters Patent is:

1. A vector oscilloscope for displaying a PAL color television signal with two components, one of said components being of known phase and the other of said components being of alternating negative and positive phase, each of said components lasting for one line of scan, said oscilloscope comprising, in combination, an oscilloscope tube with deflection plates; means connected to said deflection plates for applying said two components to said deflection plates; and means for suppressing the reproduction of said two components during alternate line scans.

2. A vector oscilloscope for displaying a PAL color television signal with two components, one of said components being of known phase and the other of said components being of alternating negative and positive phase, each of said components lasting for one line of scan, said oscilloscope comprising, in combination, an oscilloscope tube with deflection plates; means connected to said oscilloscope tube for applying said two components to said deflection plates; means for suppressing said two components during alternate line scans and comprising further: two synchronous demodulators connected in parallel; amplifiers connected to the outputs of said demodulators and applying the signals from said outputs of said demodulators to said deflection plates of said oscilloscope tube; gate means connected to the inputs of said demodulators for applying the color carrier signal of said television signal to said synchronous demodulators; and means for controlling said gate so that the modulated carrier signal is suppressed during alternate line scan.

3. A vector oscilloscope for displaying a PAL color television signal with two components, one of said components being of known phase and the other of said components being of alternating negative and positive phase, each of said components lasting for one line of scan, said oscilloscope comprising, in combination, an oscilloscope tube with deflection plates; means for applying said two components to said deflection plates; and suppression means for suppressing said two components during alternate line scans, said suppression means comprising: two synchronous demodulators connected in parallel; amplifier means connected to the outputs of said demodulators, the signals from the outputs of said demodulators being applied by said amplifier means to said deflection plates of said oscilloscope tube; gate means connected to the inputs of said demodulators for applying the color carrier signal of said color television signal to said synchronous demodulators; means for controlling said gate means so that the modulated carrier signal is suppressed during alternate line scans; scale means mounted in front of said oscilloscope tube and having regions for indicating the positive or negative phases of said other component, the modulated color carrier signal being transmitted by said gate means only for the direction of those lines during which the phase relationship of the color difference component for said scale is transmitted.

4. A vector oscilloscope as defined in claim 3 including phase shifting means for shifting the phase relationship of an unsuppressed component by 180°, when said unsuppressed component is not associated with said scale means.

5. A vector oscilloscope as defined in claim 2 including means for generating a train of pulses from the input signal, the frequency of said train of pulses being equal to half the horizontal frequency of the input signal and the phase relationship of said input signal coinciding with the phase relationship of the component associated with said scale means; and means for applying said train of pulses to said gate means for controlling said gate means.

6. A vector oscilloscope as defined in claim 4 including an electronic switch means for alternatingly shifting the phase of succeeding line scans by zero degrees and 180°; and means for applying the output signal of said electronic switch means to the synchronous demodulator for said other component.

7. A vector oscilloscope as defined in claim 1 including control means connected to the control electrode of said oscilloscope tube for applying to said control electrode a control voltage for suppressing the reproduction of said two components during alternate line scans.

8. A vector oscilloscope as defined in claim 7 wherein said alternate line scans comprise even-numbered line scans.

9. A vector oscilloscope as defined in claim 7 wherein said alternate line scans comprise odd-numbered line scans.

10. A vector oscilloscope for viewing a PAL color television signal comprising, in combination, an oscilloscope tube; means for applying to said oscilloscope tube two demodulated color difference components comprising a first color difference component of predetermined phase and a second color difference component of alternating positive and negative phase, said components being transmitted for the duration of one line scan; and means for suppressing the reproduction of said two components during alternate line scans.

11. A vector oscilloscope as defined in claim 10 including control means for applying a control voltage to one electrode of said oscilloscope tube for suppressing said two demodulated color difference components during alternate line scans.

12. A vector oscilloscope as defined in claim 10 wherein said alternate line scans are even-numbered line scans.

13. A vector oscilloscope as defined in claim 10 wherein said alternate line scans are odd-numbered line scans.